United States Patent [19]

Maier et al.

[11] Patent Number: 5,775,355

[45] Date of Patent: Jul. 7, 1998

[54] METHOD FOR MEASURING THE LIFT OF A VALVE NEEDLE OF A VALVE AND FOR ADJUSTING THE VOLUME OF MEDIA FLOW OF THE VALVE

[75] Inventors: Stefan Maier, Kawasaki, Japan; Joachim Stilling, Fellbach; Frank Schindler, Markgröningen, both of Germany

[73] Assignee: Robert Bosch GmbH, Stuttgart, Germany

[21] Appl. No.: 613,952

[22] Filed: Mar. 11, 1996

[51] Int. Cl.$^6$ .................................................. F02M 65/00
[52] U.S. Cl. ............... 137/15; 137/554; 73/119 A; 29/890.124; 29/407.04
[58] Field of Search ................ 137/15, 554; 29/890.12, 29/890.124, 407.04; 73/119 A

[56] References Cited

U.S. PATENT DOCUMENTS

| | | | |
|---|---|---|---|
| 3,739,177 | 6/1973 | Ko | 250/206 |
| 4,299,251 | 11/1981 | Dugas | 137/554 X |
| 4,545,530 | 10/1985 | Hofmann et al. | 137/554 X |
| 4,638,659 | 1/1987 | Schiessle et al. | 73/119 A |
| 4,667,511 | 5/1987 | Mausner | 73/119 A |
| 4,793,313 | 12/1988 | Paganon et al. | 73/119 A X |
| 5,197,429 | 3/1993 | Kita | 73/119 A |
| 5,224,512 | 7/1993 | Nogami et al. | 137/554 |
| 5,241,858 | 9/1993 | Wieczorek et al. | 73/119 A |
| 5,271,270 | 12/1993 | Knauer et al. | 73/119 A |

FOREIGN PATENT DOCUMENTS

40 23 828  1/1992  Germany.

*Primary Examiner*—John Rivell
*Attorney, Agent, or Firm*—Kenyon & Kenyon

[57] ABSTRACT

In a method for measuring lift of a valve needle and for adjusting the volume media flow of a valve, easily focused, high-energy radiation is used, which permits a contact-free measuring operation. The high-energy radiation is directed at the valve-closure member that is permanently joined to the valve needle in the installed valve. By performing a differential measurement, thus a measurement in both end positions of the valve needle, the lift of the valve needle can be determined and, thus, corrected. The measurement is performed on a dry valve. The method is particularly suited for electromagnetically actuated fuel-injection valves of mixture-compressing internal-combustion engines having externally supplied ignition.

16 Claims, 5 Drawing Sheets

METHOD FOR MEASURING THE LIFT OF A VALVE NEEDLE OF A VALVE AND FOR ADJUSTING THE VOLUME OF MEDIA FLOW OF THE VALVE

FIELD OF THE INVENTION

The present invention relates to a method for measuring the lift of a valve needle and a resulting simplified adjustment of the static volume of the media flow delivered during the open setting of an electromagnetically actuated valve.

BACKGROUND INFORMATION

In the case of known, so-called bottom-feed, or side-feed injection valves, it is possible to measure the lift of a valve needle only through considerable expense, for instance, using a mechanical lift sensor, such as a measuring pin, given an installed restoring spring, against whose spring energy the injection valve is opened. In some cases, such a measurement is not even possible.

German Published Patent Application No. 40 23 828 describes a bottom-feed injection valve, in which the restoring spring does not have to be accessed to adjust the dynamic volumetric media flow. Rather, the restoring spring has a constant, preset spring energy. The dynamic volumetric media flow is adjusted by altering a magnetic restrictor constructed in the magnetic circuit. A magnetically conductive material, which alters the magnetic properties of an internal pole, is introduced into an internal pole of the injection valve to vary the magnetic force until the actual measured dynamic quantity (volume) delivered by the valve conforms with a specified, desired dynamic volume.

To adjust the static volumetric media flow during the open setting of the valve needle, it is necessary for the volumetric media flow sprayed off to be measured during a predetermined time and for the lift of the valve needle to be altered by shifting the valve seat member. A so-called "wet" adjusting method of this type is not only expensive, but also requires a later cleaning of the injection valve. It is not possible to directly measure the lift of the valve needle using known feelers because of the small diameter of the spray-off holes.

SUMMARY OF THE INVENTION

An advantage of the method according to the present invention is that by applying a simple, very exact, contact-free and dry measuring method, it is possible to measure the lift of a valve needle, even when only very small cross-sections are available inside an injection valve for the measurement, so that a simple, precise and cost-effective adjustment of the valve is rendered possible without the risk of contamination with respect to its static volume of the media flow to be delivered.

Particularly advantageous for measuring the lift of the valve needle of the valve is the application of a laser system, which enables laser beams to be directed through spray-off holes of an apertured spray disk onto a valve-closure member that is permanently joined to the valve needle. The lift of the valve needle is then measured as a differential measurement, in that at least the linear measured values measured in both end positions of the valve needle are considered.

It is advantageous that the lift of the valve needle can be measured given a dry valve. One can dispense with measuring the static volumes of the media flow by correlating the measured values of the valve-needle lift and the static volume of the media flow, the latter being defined, thus making an exact adjustment possible.

Moreover, it is advantageous that the danger of contamination is greatly reduced. The method according to the present invention functions in a contact-free manner. The lift adjustment takes place only after all sealing parts have been assembled in the valve and is rendered possible by the prestressing of the restoring springs.

It is especially advantageous when two laser beams are directed simultaneously into two spray-off holes of the apertured spray disk or when one laser beam is sent out with a time delay through two spray-off holes, i.e., one after the other. This substantially eliminates measurement errors caused by the play in the guidance of the valve-closure member. The lift of the valve needle follows from the sum of the two differential measured values attained through the two spray-off holes, divided by two.

DETAILED DESCRIPTION

Figure 1:
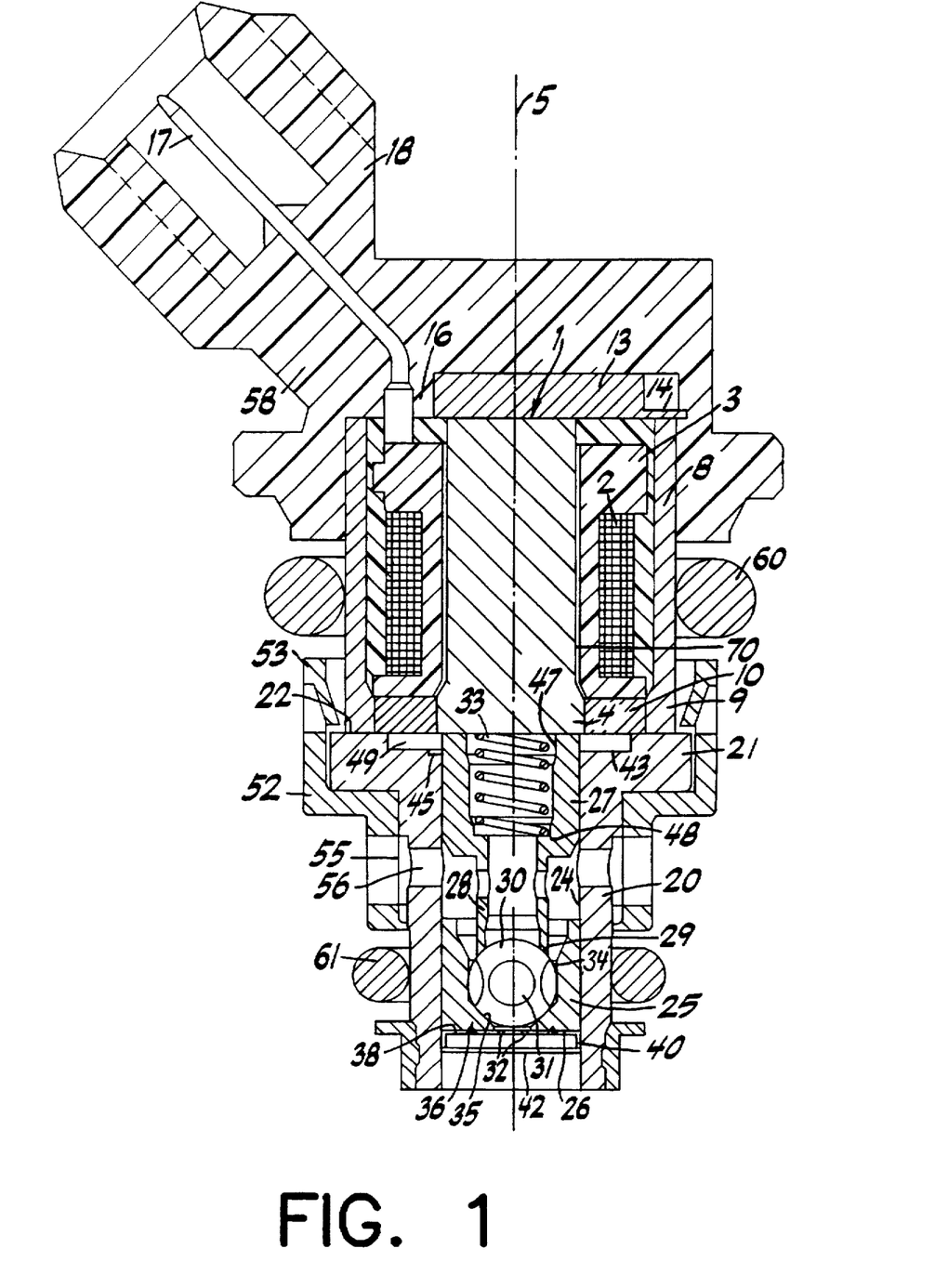
FIG. 1 shows an adjustable valve according to the present invention.

An example of the electromagnetically actuated fuel-injection valve according to the present invention is shown in FIG. 1 for fuel-injection systems of mixture-compressing internal-combustion engines having externally supplied ignition. The valve has a stepped internal pole 1 of ferromagnetic material, which is partially surrounded by a solenoid coil 2. A circumferential, U-shaped coil form 3 which is stepped in the radial direction accommodates a winding of the solenoid coil 2 and, with its inner diameter, radially surrounds the internal pole 1 with a small clearance. Formed at its lower pole end 4 is a flange-type thickening, which extends, as does the entire internal pole 1, concentrically to a longitudinal valve axis 5.

The solenoid coil 2 with its stepped coil form 3 is surrounded by a valve casing 8, which prior to the assembly of the fuel-injection valve is formed, for example, as a one-piece magnet body, together with the internal pole 1. The valve casing 8 extends in the axial direction to the same extent as the internal pole 1 and has an inwardly directed thickening at its lower casing end 9.

Situated between the pole end 4 and the casing end 9 is an inserted, non-magnetic intermediate ring 10, which is soldered to the originally one-piece magnet body 80 including an internal pole 1 and valve casing 8 and which prevents a magnetic short-circuiting between the internal pole 1 and the valve casing 8.

A circular housing cover 13, which has, for example, three to six fixing straps 14 on the outer periphery, is mounted at the end facing away from the lower pole end 4 of the internal pole 1, above the solenoid coil 2 and across the internal pole 1 in the radial direction up to the valve casing 8. The housing cover 13 is made, for example, of ferritic sheet metal and has at least one bushing 16, through which run contact tags 17 that emanate from an electrical plug connector 18 to electrically contact the solenoid coil 2.

A radially stepped valve-seat support 20 extends in the axial direction with an upper, radially outwardly directed supporting section 21 up to the casing end 9 of the valve casing 8 and abuts there with a flat, upper end face 22. The casing end 9 of the valve casing 8 and the carrier section 21 of the valve-seat support 20 are permanently joined, for example, by means of a radial weld. In a feed-through opening 24 formed concentrically to the longitudinal valve axis 5 and facing away from the solenoid coil 2, the valve-seat support 20 has a valve-seat member 25 with an apertured spray disk 26. A tubular armature 27, for instance, which interacts with the pole end 4 of the internal pole 1, projects into the feed-through opening 24 of the valve-seat support 20. In addition, a tubular valve needle 28, for instance, which is formed in one piece with the armature 27 and, upstream, projects out of the armature 27, is arranged in the feed-through opening 24.

At its downstream end 29 facing the apertured spray disk 26, the valve needle 28 is joined, for example by means of welding, to, for example a spherical valve-closure member 30, on whose periphery, for example, five flattened areas 31 are provided. The flattened areas 31 on the periphery of the valve-closure member 30 promote the unhindered flow of fuel through the valve seat member 25 up to the spray-off holes 32 in the apertured spray disk 26. The compact, very light and movable valve part including the tubular armature 27, the valve needle 28 and of the valve-closure member 38 having a spherical form not only renders possible a good dynamic performance and good endurance characteristics for the fuel-injection valve, but, in addition, also a short and compact type of construction for the fuel-injection valve.

As is generally known, the injection valve is actuated electromagnetically. The electromagnetic circuit comprising the solenoid coil 2, the internal pole 1, and the armature 27 serves to axially move the valve needle 28 and, thus, to open against the spring energy of a restoring spring 33 or to close the injection valve. A guide opening 34 of the valve-seat member 25 serves to guide the valve-closure member 30 during the axial movement of the valve needle 28 together with the armature 27 along the longitudinal valve axis 5. The spherical valve-closure member 30 interacts with a valve-seat surface 35 of the valve-seat member 25, which is tapered in a truncated-cone shape in the direction of flow and is formed in the axial direction downstream from the guide opening 34. The periphery of the valve-seat member 25 has a slightly smaller diameter than the feed-through opening 24 of the valve-seat support 20. At its side facing away from the valve-closure member 30, the valve-seat member 25 is concentrically and permanently joined by a first weld 36 to the, for instance, cup-shaped apertured spray disk 26.

Besides a base part 38, to which the valve-seat member 25 is secured and in which run the at least one (for instance, four) spray-off holes 32 formed using erosion or punching methods, the apertured spray disk 26 has a circumferential, downstream running retention rim 40. The retention rim 40 of the apertured spray disk 26 abuts while being radially tensioned against the feed-through opening 24 of the valve-seat support 20 and is joined to this opening, for instance, by means of a circumferential and impervious second weld 42, produced, for example, by means of a laser. The lift of the valve needle 28 is already roughly preset when the apertured spray disk 26 is secured to the valve-seat member 20 and, in the end, is precisely adjusted to a specified setpoint value by means of the method according to the invention for measuring the lift of and adjusting the valve.

To mechanically guide the movable valve part comprised of the armature 27, valve needle 28 and valve-closure member 30 in the feed-through opening 24 of the valve-seat support 20, for instance, six lugs 45 are formed at an upstream inner end 43 of the valve-seat support 20 in the axial area of the upper carrier section 21 and run at equal distances on the periphery of the feed-through opening 24 to the inside, in the direction of the longitudinal valve axis 5. The armature 27 projects with very little play through the feed-through opening 24 that is reduced in its diameter by the lugs 45. At its end facing away from the internal pole 1, in an inner, stepped through-hole 47, the tubular armature 27 has a spring recess 48, against which is braced the one end of the restoring spring 33, while the other end of the restoring spring 33 abuts on the pole end 4 of the internal pole 1.

A circumferential cavity 49 having a small axial extent is formed between the inner end 43 of the valve-seat carrier 20 and the non-magnetic intermediate ring 10. The cavity 49 guarantees that the magnetic lines of force run from the valve casing 8 via the valve-seat support 20 and the armature 27 to the internal pole 1 and do not produce any short-circuiting from the valve casing 8 via the valve-seat support 20 to the internal pole 1, without effecting the armature 27.

Arranged at the periphery of the valve-seat support 20 to correspond to its contour is a stepped supporting ring 52, which extends, for example, axially in the direction of the solenoid coil 2, beyond the valve-seat support 20, in order to ensure, with a plurality of detents 53, a simple and cost-effective mounting attachment to the valve-seat support 20. Arranged in the supporting ring 52 is a fuel filter 55, by way of which fuel can flow from a fuel source to transverse openings 56. This fuel-injection valve is to be allocated to the group of the so-called bottom-feed injection valves. The fuel flows, therefore, in the immediate vicinity of the valve-seat surface 35 into the injection valve and comes exclusively in contact with the movable valve parts inside the valve-seat support 20. Directed toward the solenoid coil 2, the injection valve is tightly sealed off at the magnet body comprised of the internal pole 1 and the valve casing 8. Thus, contrary to the so-called top-feed injection valves, no fuel arrives in the axial area of extent of the solenoid coil 2. Due to its compact type of construction that is sealed off to the armature 27, the magnet body, with its internal pole 1 and the valve casing 8, does not allow any adjustments of the flow rate of the fuel or rather measurements of the lift of the valve needle 28 inside the injection valve.

At least one part of the valve casing 8, as well as the housing cover 13 in its entirety, are surrounded by a plastic extrusion coat 58, onto which is premolded at the same time the electrical plug connector 18, via which the electrical contacting and, thus, the excitation of the solenoid coil 2 takes place.

Sealing rings 60 and 61 are arranged above and below the radial transverse openings 56 in the valve-seat support 20 on the periphery of the fuel-injection valve. The sealing rings 60 and 61 are used to seal off between the periphery of the fuel-injection valve and a valve mount (not shown), for example the intake line of the internal combustion engine.

The insertion depth of the valve-seat part including the valve-seat member 25 and the cup-shaped apertured spray disk 26 in the feed-through opening 24 determines the adjustment of the lift of the valve needle 28, since the one end position of the valve needle 28, given a non-excited solenoid coil 2, is determined by the fitting of the valve-closure member 30 on the valve-seat surface 35 of the valve-seat member 25. The other end position of the valve needle 28 is determined, given an excited solenoid coil 2, for example, by the fitting of the armature 27 on the pole end 4 of the internal pole 1. Thus, the path between these two end positions of the valve needle 28 represents the lift.

In the case of bottom-feed injection valves, it is not possible to measure the lift of the valve needle 28, for instance using a mechanical lift sensor, thus, for instance, a measuring pin, which reaches from the side facing away from the apertured spray disk 26 into the injection valve. The massive internal pole 1 of the magnet body does not allow the introduction of a measuring sensor. The restoring spring 33, which is also being tensioned when the valve-closure member 30 abuts on the valve-seat surface 35, presses against the pole end 4 of the internal pole 1, so that the valve needle 28 is fixed in position.

The lift of the valve needle 28 can also be measured using the method according to the present invention for bottom-feed injection valves in that linear measurements are made through the spray-off holes 32 located in the apertured spray disk 26, which have a very small diameter of, for example, 0.2 to 0.4 mm, by directing highly collimated, high-energy radiation, for instance laser beams 70, at the valve-closure member 30. The measurement of the lift of the valve needle 28 preferably does not take place in the installed state of the valve in the engine so that negative influences, such as high temperatures or vibrations, are avoided. Rather, the measurement preferably takes place in a controlled test environment in the manner described below. Once the lift of the valve needle 28 has been adjusted according to the present invention, the fuel injection valve is installed in the engine.

Figure 4:
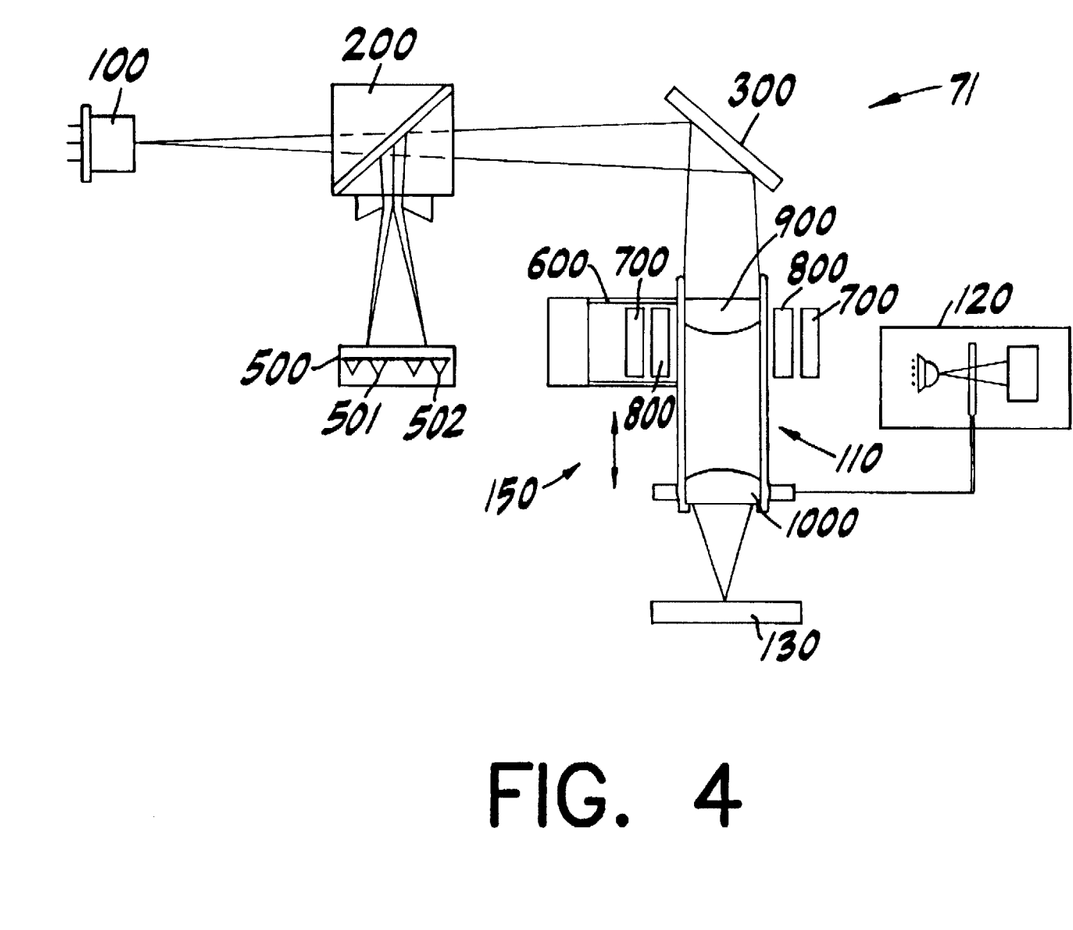
FIG. 4 shows the operation of an exemplary laser system according to the present invention.

The operation of an exemplary laser system 71 to make a lift measurement is illustrated in FIG. 4. As shown in FIG. 4, a laser diode 100 emits a laser beam (e.g., a measuring beam), which passes through a beam splitter 200 (e.g., a prism having a divider mirror), towards the object to be measured 130. This arrangement of the beam splitter 200 allows the measuring beam through in one direction, but not through in the reverse direction. Thus, the laser beam passes through the beam splitter 200 and for example, is deflected by 90° by a divider mirror 300 into a tube 110. The tube 110 forms an optical system 150 having various lenses such as, for example, a collimator lens 900 and a moveable objective lens 1000. Focusing of the laser beam takes place in the tube 110 in a manner known to those skilled in the art.

The laser beam is reflected from the surface of the object to be measured 130. The reflected beam passes back, through the tube 110 and the divider mirror 300 to the beam splitter 200, where the reflected beam is deflected to a focus detector 500, the focus detector 500 including, for example, at least two photodiodes 501, 502. The photodiodes 501, 502 are coupled to a system including, for example, a plate spring 600, a coil 700 and a magnet 800 of the tube 110. This system can be controlled with the help of the photodiodes 501, 502, thus making it possible to adjust the moveable objective lens 1000 and thereby the optical system 150.

The differential signal between the photodiodes 501, 502 amounts to zero when the object to be measured 130 is exactly in the focal point of the laser beam, and consequently both photodiodes 501, 502 are symmetrically illuminated. If the position of the object 130 changes, then the object 130 no longer is in the focal point of the laser beam, causing asymmetrical illumination of the photodiodes 501, 502, and resulting in an output signal representative of the change in the position of the object 130. Control of the system coupled to the photodiodes 501, 502 causes an adjustment of the objective lens 1000 so that the laser beam becomes refocussed on the object 130.

Thus, for example, in one end position of the valve needle 28 (such as in the case of the non-excited solenoid coil 2 and the contact of the valve-closure member 30 against the valve-seat surface 25), the measuring beam is exactly focused on the surface of the valve-closure member 30. Thereupon, the solenoid coil of the valve is excited so that the other end position of the valve needle 28 is reached when the armature 27 abuts on the pole end 4 of the internal pole 1.

By this axial movement of the valve needle 28 and the valve-closure body 30 attached to it, a defocussing of the laser beams is achieved. The now displaced reflected beam reaches, for example, a photodiode 501, 502 of the laser system 71. Subsequent control of the system that controls the coil 700 and the magnet 800 is effected until the measuring beam is exactly focussed again on the surface of the object to be measured 130, e.g. valve-closure body 30. The linear value of the lift of the valve needle 28 to be measured can be determined from the magnitude of the adjustment of the lens system of the tube 110 via an evaluation and control system 120.

Accordingly, the laser system 71 is controlled so that the laser beam is focussed on the object to be measured 130 (for example, a valve-closure member of a fuel injection valve, in accordance with the principles of the present invention). The focussing of the beam on a very small point on the surface of the object 130 is effected via the optical system 150. The evaluation and control system 120 coupled to the optical system delivers an output signal that is proportional to the change in distance resulting from the movement of the object to be measured 130, as reflected by the movement of the moveable objective lens 1000. The evaluation and control system 120 can include, for example, a light barriers measuring system.

The laser system 71 produces laser beams 70, which are able to be focussed quite well at a very small point on the top surface of the valve-closure member 30. The diameters of the laser points to be focussed lie favorably within a range of a few micrometers or below. The laser system 71 can include, for example, a dynamic auto focusing laser system, such as an optical sensor MICROFOCUS No. 1080 or optical sensor TELEFOCUS No. 1083 by UBM Messtechnik GmbH of Ettlingen, Federal Republic of Germany. The working distance of the objective lens 1000 in the tube 110 to the object to be measured 130 can be, for example, approximately 2 mm for the MICROFOCUS laser system or approximately 13 mm for the TELEFOCUS laser system. The measuring range, i.e. the tube 110 path in the laser system 71 in the z-direction, is preferably +/−500 μm.

Other laser systems which provide a strongly collimated, high energy laser beam also can be used for the laser system 71 to measure the lift of the valve needle 28 according to the present invention. Examples of such laser systems are described in: *3D-Digitalisierung of Freiformflachen mit Laser*, from VDI-Z 132 (1990), No. 7, pp. 49–52; *Beruhrungsloses Messen in der Fertigungstechnik*, from VDI-Z 128 (1986), No. 17, pp. 629–34; and *Dynamischer Autofokussensor zur dreidimensionalen Mikrostrukturerfassung*, from tm-Technisches Messen 59 (1992) 1, pp.3–9, R. Oldenbourg Publishing House, which are hereby expressly incorporated by reference.

Figure 2:
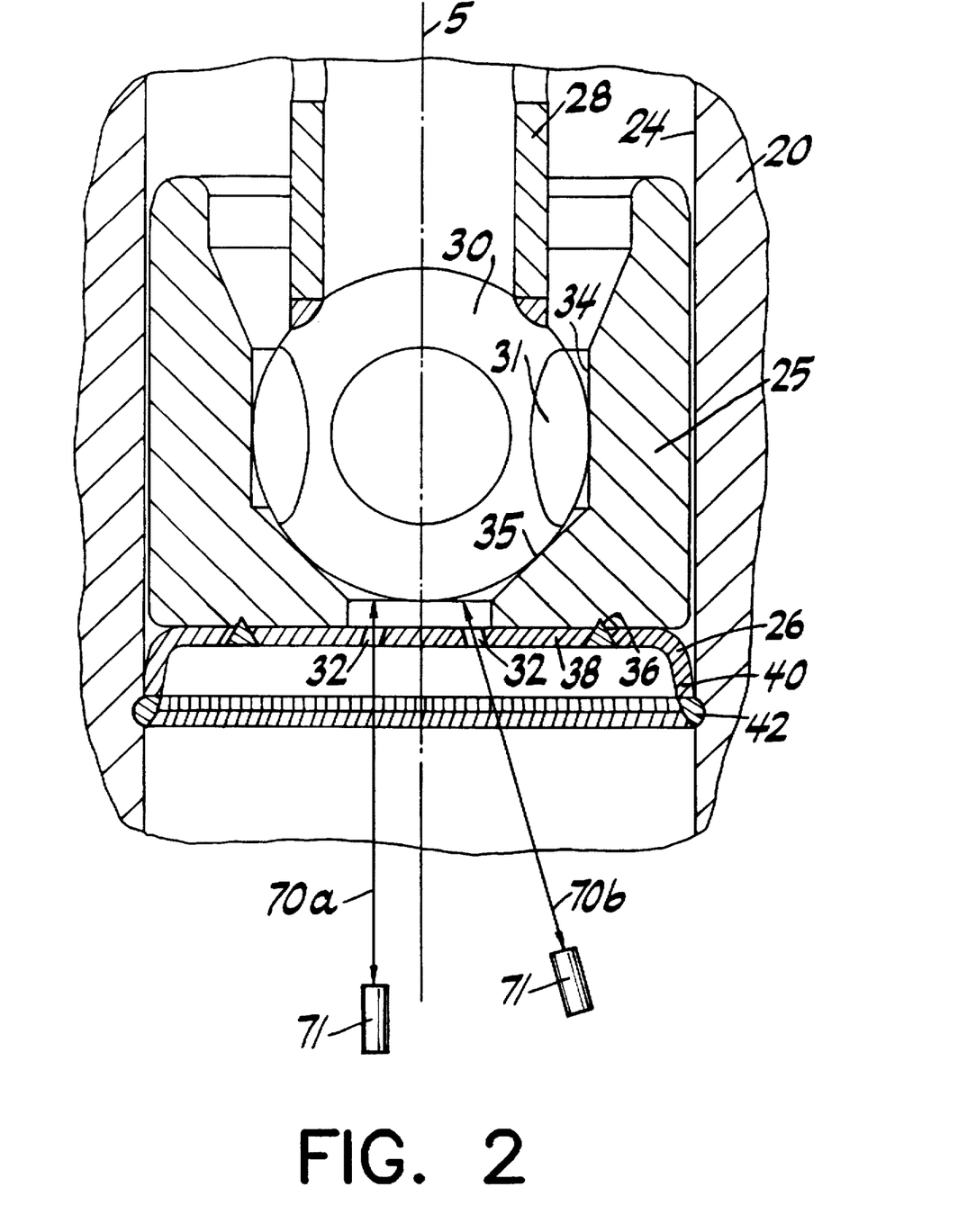
FIG. 2 shows a first and a second exemplary embodiment of the measuring area of a valve according to the present invention, for supporting the method according to the present invention.
Figure 3:
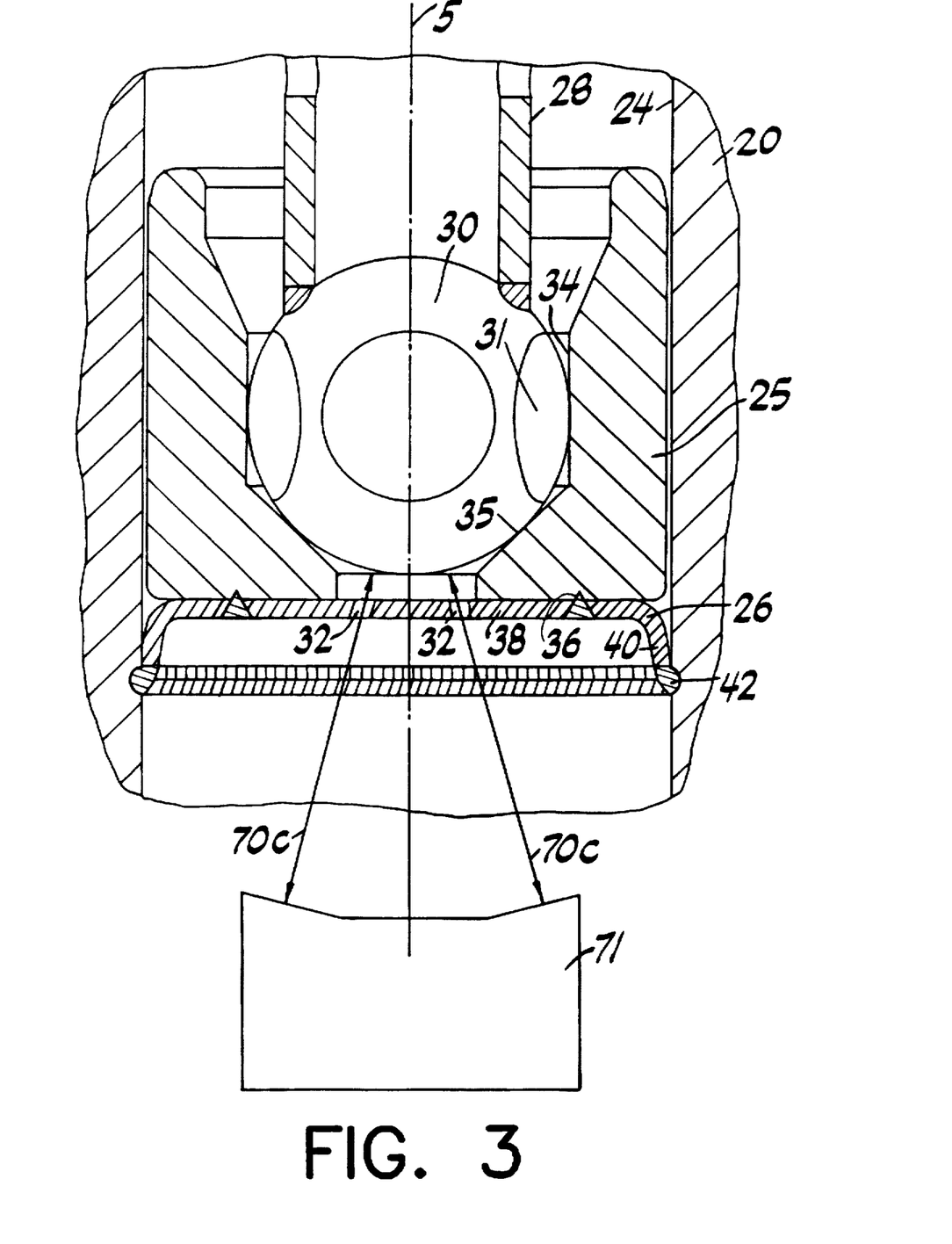
FIG. 3 shows a third exemplary embodiment of the measuring area of a valve according to the present invention, for supporting the method according to the present invention.

In an enlarged representation, FIGS. 2 and 3 depict the areas of the injection valve around the valve-seat surface 35, in which the contact-free measurement of the lift of the valve needle 28 takes place. A first variant of the lift measurement according to the present invention provides for a laser beam 70a to be directed exactly parallel to the longitudinal valve axis 5 through a spray-off hole 32 at the valve-closure member 30. The measurement with the laser beam 70a must be performed at least in the already described two end positions of the valve needle 28, thus given a non-excited solenoid coil 2, when the valve-closure member 30 fits on the valve-seat surface 35 of the valve-seat member 25 and, given an excited solenoid coil 2, when the armature 27 abuts on the pole end 4 of the internal pole 1.

In a second variant for measuring the lift of the valve needle 28, a laser beam 70b is generated so as to travel through a spray-off hole 32 of the apertured spray disk 32 and strike perpendicularly on the top surface of the spherical valve-closure member 30. It is again necessary here to transmit the laser beams 70b to the valve-closure member 30 in both end positions of the valve needle 28, to be able to determine the difference and, thus, the distance covered axially by the valve-closure member 30 permanently joined to the valve needle 28. With this second variant, a clearly improved reflection of the laser beams 70b is achieved, the alignment of the laser system 71 being substantially more costly, to guarantee an exactly perpendicular striking of the laser beams 70b on the top surface of the valve-closure member 30 in both end positions of the valve needle 28.

One should start from the assumption that in the case of axial movement of the valve needle 28 and of the valve-closure member 30 in the guide opening 34, a minimal eccentricity of the valve-closure member 30 can occur. Consequently, this appears as a measuring error in the result of the lift measurement in the two described variants depicted in FIG. 2, with the respective individual laser beams 70a and 70b. As a result of the radial play in the guidance of the valve-closure member 30, measuring errors of up to +/−5% may still result in the two exemplary embodiments.

This type of error can be substantially eliminated by the third variant of the lift measurement of the valve needle 28 of a bottom-feed injection valve depicted in FIG. 3. In this case, the measurement is made, namely, through at least two spray-off holes 32 of the apertured spray disk 26. Consequently, in the case of apertured spray disks 26 having two spray-off holes 32, both of these are used and, in the case of apertured spray disks 26 having four spray-off holes 32 arranged, for example, in a square, two diagonally opposed spray-off holes 32 are used, for instance. At this point, the measurement is made in that, at least in both end positions of the valve needle 28, two laser beams 70c are simultaneously directed into the two provided spray-off holes 32 or one laser beam 70c is sent out with a time delay through two spray-off holes 32. This measurement is now substantially free of errors which can occur as a result of the play in the guidance of the valve-closure member 30 in the guide opening 34.

The laser beams 70c are aligned, for example, so as to strike perpendicularly on the top surface of the valve-closure member 30, as in the second exemplary embodiment. The lift of the valve needle 28 follows from the sum of the two measured values attained through the two spray-off holes 32, divided by two. Any possible corrections resulting from the measuring method of the laser beams 70b, 70c directed perpendicularly to the top surface of the valve-closure member 30 must be subsequently incorporated in the measuring result.

Consequently, the measurement of the lift of the valve is needle 28 is a differential measurement, since the difference between the two measured values in the two end positions of the valve needle 28 represents the axial range of motion of the valve-closure member 30. The advantage of the first variant is that a laser system 71 emitting the laser beams 70 can be simply aligned parallel to the longitudinal valve axis 5. For that reason, however, the laser beams 70a do not strike the curved surface of the spherical valve-closure member 30 perpendicularly, so that the result may be a relatively poor reflection of the laser beams 70a.

Figure 5:
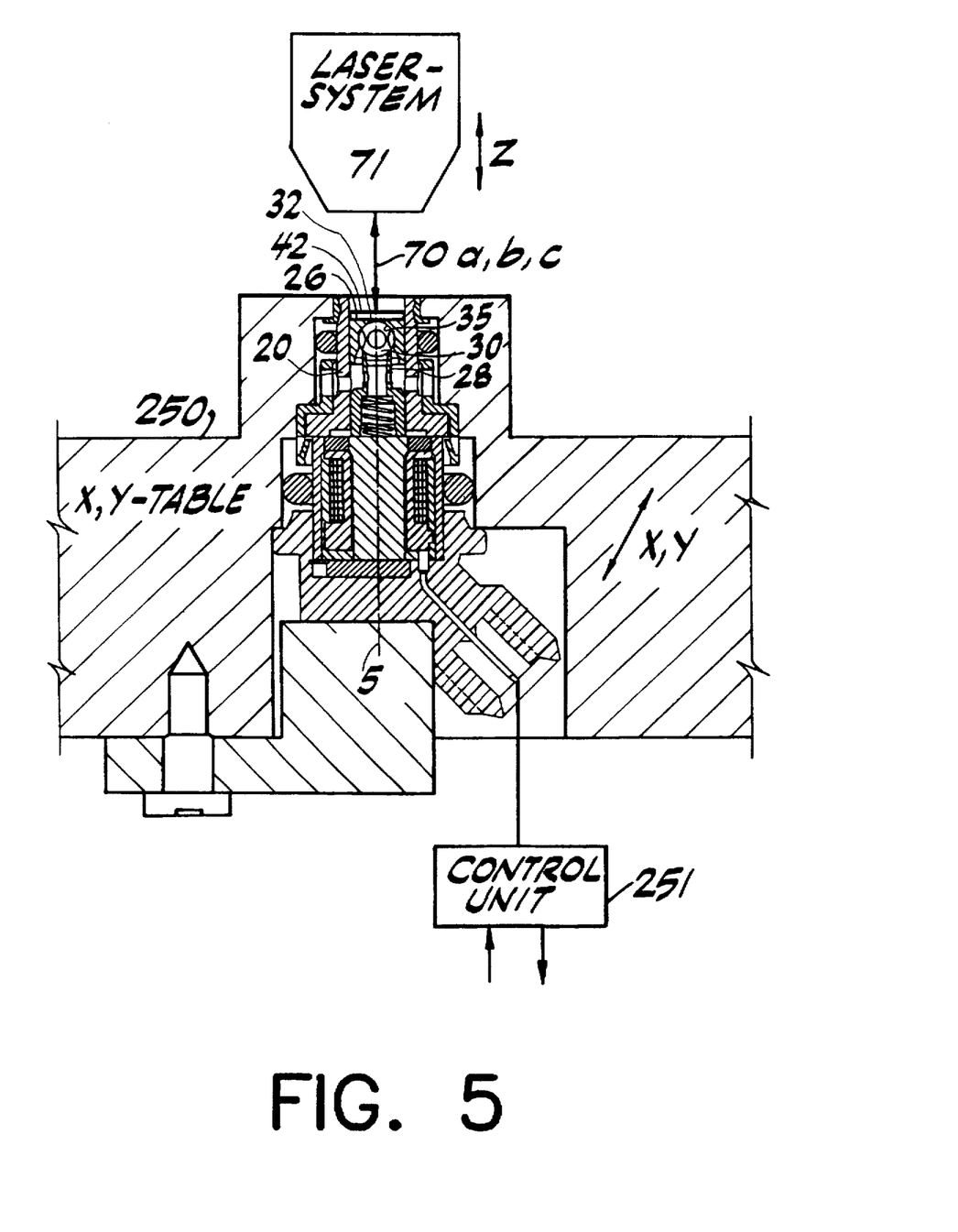
FIG. 5 illustrates an exemplary arrangement of a laser system and a fuel injection valve according to the present invention.

FIG. 5 illustrates an exemplary arrangement, not to scale, according to the present invention of a laser system 71 and a valve needle 28 for measuring the lift of the valve needle 28 using laser beams 70. As shown in FIG. 5, the fuel injection valve is firmly clamped in a reverse fitting position to a measuring apparatus 250, e.g. an x/y measuring table 250. The fastening of the fuel injection valve to the x/y measuring table shown in FIG. 5 is illustrative only, other approaches for fastening the valve to the table being possible. The x/y measuring table 250 is movable along the two coordinates, x and y, in order to bring the valve exactly into the desired measuring position. The position of the valve needle 28 is controlled by a control unit 251 in a manner known to those skilled in the art. Thus, the control unit 251 moves the valve needle 28 into the respective end positions for determining the lift of the valve needle 28.

The laser system 71 is disposed above the fuel injection valve and is movable in the z direction, thus allowing laser beams 70 to be focused to the valve-closure member 30. Thus, the laser system 71 can be placed at a desired working distance perpendicular downwards to the valve and the valve needle 28. Once the laser system 71 is positioned above the x/y measuring table 250, the actual measuring operation is carried out as described above, e.g., by focusing the laser beams 70 on the surface of the, for example, spherical valve-closure member 30 and by the adjustment of the tube 110 with the objective lens 1000 along the z coordinate to refocus the laser beam in response to movement of the valve needle 28 and the valve-closure member 30.

These contact-free measurements of the lift of the valve needle 28 using laser beams 70 render possible a precise and simple adjustment of the lift. The lift of the valve needle 28 is already roughly preset when the apertured spray disk 26 is secured to the valve-seat support 20 and, in the end, is precisely adjusted to a specified setpoint value using the method according to the present invention for measuring lift and for adjusting the valve. In accordance with the measuring results, the apertured spray disk 26 that is permanently joined to the circumferential and impervious second weld 42 on the valve-seat support 20 can be pressed in the axial direction, thus along the longitudinal valve axis 5. The apertured spray disk 26 is pressed axially using a tool until the actual values measured by means of the laser system 71 conform with specified setpoint values for the lift. Before an exact adjustment can be made, one must correlate the lift of the valve needle 28 and the static volumes of the media flow delivered during the open settings. Only in this manner can the linear measured values determined when the lift of the valve needle is measured be transferred to values for the volumes of the media flow. The setpoint values for the lift of the valve needle 28 correspond to precisely known, specified volumes of media flow to be delivered.

Thus, the measurement and adjustment of the lift of the valve needle 28 take place in a contact-free and dry is manner, i.e., no volumes of media flow directed through the injection valve are necessary, since the static volume of media flow is precisely established to correspond to a desired setpoint value by the size of the spray-off holes 32 of the apertured spray disk 26 and the precisely adjusted lift of the valve needle 28, through which the lift-restrictor component in the area of the valve-seat surface 35 is precisely defined.

What is claimed is:

1. A method for adjusting a lift of a valve, the valve having a longitudinal valve axis, a valve-seat surface, a valve needle and a valve-closure member connected to the valve needle, the valve needle lifting along the longitudinal valve axis in a direction opposite to the valve-seat surface, the method comprising the steps of:

directing collimated, high-energy radiation at the valve-closure member;

receiving a reflection of the collimated, high-energy radiation from the valve-closure member;

measuring an axial range of motion of the valve needle as a function of the reflected radiation; and adjusting the lift of the valve needle along the longitudinal valve axis as a function of the axial range of motion.

2. The method according to claim 1, wherein the valve is an electromagnetically actuated fuel-injection valve.

3. The method according to claim 1, wherein the valve-closure member is fitted on the valve-seat surface.

4. The method according to claim 1, further comprising the step of adjusting a static volume of a media flow based upon the measurement of the axial range of motion.

5. The method according to claim 1, wherein the measurement is performed using a contact-free technique.

6. The method according to claim 1, wherein the radiation is in the form of a laser beam.

7. The method according to claim 1, wherein the radiation is directed at the valve-closure member through at least one spray-off hole downstream of the valve-closure member.

8. The method according to claim 1, wherein the radiation is directed parallel to the longitudinal valve axis.

9. The method according to claim 1, wherein the radiation strikes the valve-closure member perpendicular to a top surface of the valve-closure member.

10. The method according to claim 1, wherein the directing step includes the step of simultaneously directing two laser beams at the valve-closure member through respective spray-off holes downstream of the valve-closure member.

11. The method according to claim 10, wherein the measurement step includes the steps of:

measuring a first value at a first end position of the valve needle;

measuring a second value at a second end position of the valve needle; and determining a difference between the first and second values.

12. The method according to claim 4, further comprising the step of correlating the lift of the valve needle with the static volume of the media flow.

13. The method according to claim 1, wherein the radiation is directed at the valve-closure member through at least one spray-off hole in an apertured spray disk downstream of the valve-seat surface.

14. The method according to claim 1, wherein the step of measuring the axial range of motion further includes the steps of placing the valve in a measuring apparatus.

15. The method according to claim 14, wherein the measuring apparatus includes an x/y table.

16. The method according to claim 14, further comprising the step of disposing a laser system above the valve-closure member.

* * * * *